United States Patent [19]

Moghadam et al.

[11] Patent Number: 5,706,049
[45] Date of Patent: Jan. 6, 1998

[54] CAMERA THAT RECORDS AN ACTIVE IMAGE AREA IDENTIFIER WITH AN IMAGE

[75] Inventors: Omid A. Moghadam; Stuart F. Ring; John R. Squilla, all of Rochester, N.Y.

[73] Assignee: Eastman Kodak Company, Rochester, N.Y.

[21] Appl. No.: 565,433

[22] Filed: Nov. 30, 1995

[51] Int. Cl.$^6$ .................... H04N 5/76; H04N 5/222
[52] U.S. Cl. .................... 348/333; 348/232; 348/233; 348/552; 358/342; 358/345; 358/906; 358/909.1; 396/374
[58] Field of Search .................... 348/231, 232, 348/233, 239, 240, 333, 334, 341, 552; 354/219; 358/342, 345, 347, 348, 906, 909.1; 396/373, 374, 378, 380; 382/282, 283; H04N 5/222, 5/76

[56] References Cited

U.S. PATENT DOCUMENTS

| | | | |
|---|---|---|---|
| 4,325,080 | 4/1982 | Satoh | 358/127 |
| 4,775,898 | 10/1988 | Akabane et al. | 358/335 |
| 4,812,912 | 3/1989 | Iida et al. | 358/227 |
| 4,837,633 | 6/1989 | Parra | 358/224 |
| 5,128,768 | 7/1992 | Suda et al. | 358/227 |
| 5,187,585 | 2/1993 | Kaneda et al. | 358/227 |
| 5,223,934 | 6/1993 | Hong | 358/209 |
| 5,267,042 | 11/1993 | Tsuchiya et al. | 358/209 |
| 5,280,359 | 1/1994 | Mimura et al. | 358/228 |
| 5,341,169 | 8/1994 | Kaneda et al. | 348/352 |
| 5,398,062 | 3/1995 | Hashimoto et al. | 348/334 |
| 5,430,482 | 7/1995 | Kim | 348/333 |
| 5,477,264 | 12/1995 | Sarbadhikari et al. | 348/231 |
| 5,515,099 | 5/1996 | Cortjens et al. | 348/15 |
| 5,526,138 | 6/1996 | Sato | 358/342 |

OTHER PUBLICATIONS

Excerpt from User's Manual for Harvard Graphics software, by Software Publishing Corporation.
Excerpts from User's Manual for Create-it software, by Eastman Kodak Company.

*Primary Examiner*—Andrew Faile
*Assistant Examiner*—Ngoc-Yen Vu
*Attorney, Agent, or Firm*—David M. Woods

[57] ABSTRACT

A camera includes an image receiver for capturing an image of an object, an optical section for directing image light from the object to the image receiver, and a viewfinder for viewing the object prior to capture together with a tile pattern for specifying active "hot spot" areas in the viewed image. The tile pattern in the viewfinder is composed of a plurality of individual tile areas that are visible through the viewfinder together with the image of the object. The camera further includes means for designating one or more individual tile areas as active areas of the image, and means for recording a location of the active areas in a memory location accessible to apparatus external to the camera. The camera is part of a system in which the apparatus external to the camera is a computer. A program in the computer is responsive to the recorded locations for enabling one or more specific actions to be assigned to the active areas of the recorded image when the image is accessed by the computer.

25 Claims, 7 Drawing Sheets

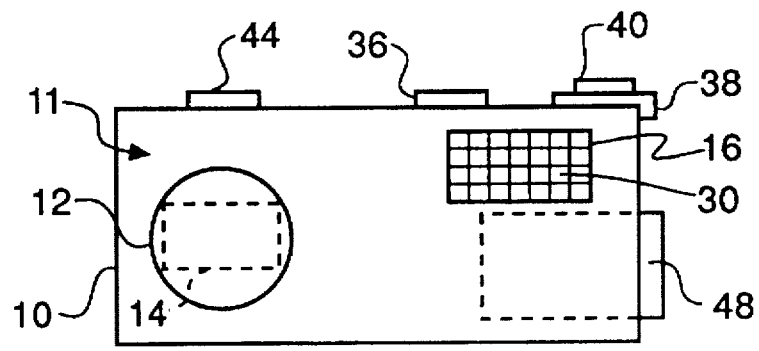
FIG. 1
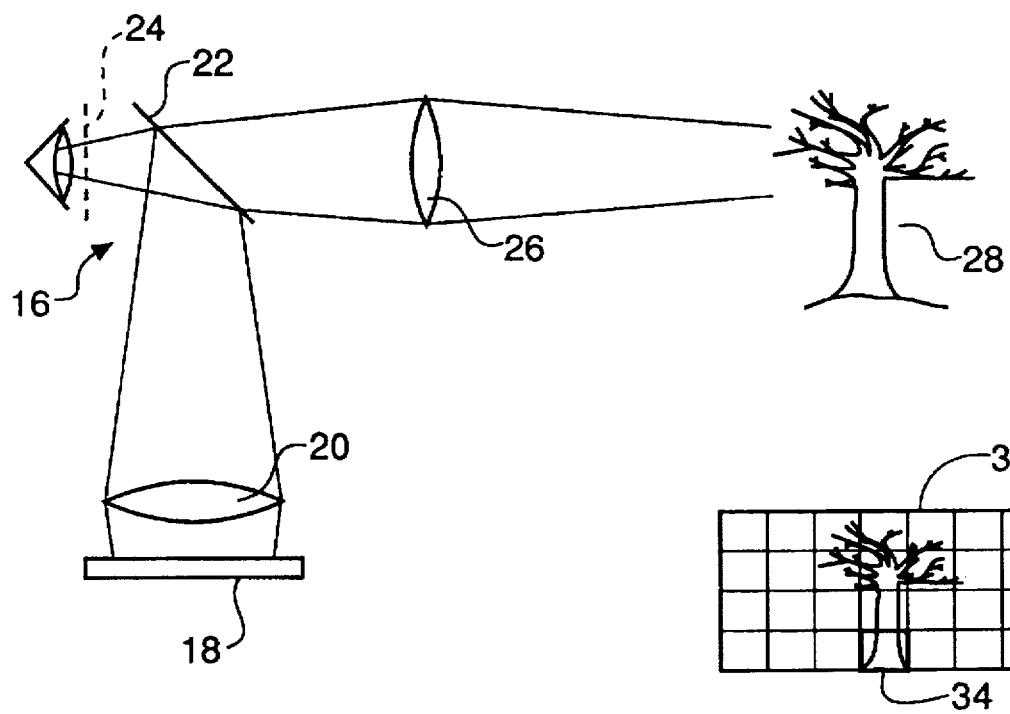
FIG. 2(a)     FIG. 2(b)

VIEWFINDER GRIDS BASED ON TEMPLATES OR CUSTOM GRID SELECTION

CAMERA THAT RECORDS AN ACTIVE IMAGE AREA IDENTIFIER WITH AN IMAGE

FIELD OF THE INVENTION

The invention relates generally to the field of photography, and in particular to a camera that allows a photographer to freely select an image area for special treatment or processing.

BACKGROUND OF THE INVENTION

In multimedia applications, it is known to associate actions or additional information with active areas, generally known as "hot spots", in digital images. These "hot spots" are generally embedded in image areas or graphics areas of the digital image. They are activated, for example, by positioning a cursor over the "hot spot" and holding down a mouse button. This causes the application to branch to a predetermined presentation sequence. Examples include assignment of an active box in the Create-It™ software provided by Eastman Kodak Company, or the assignment of a key or button in a HyperShow™ application run with Harvard Graphics™ software provided by Software Publishing Corporation. In each of these applications the task of assigning active areas in the image is accomplished after the image is captured, scanned, and digitized by manually drawing a box around the active area and then assigning the required action to the box.

In today's systems, the "hot spots" can only be defined after the image is digitized, entered into the computer, and opened in the specific application. There is no standard method for segmenting images for identifying active areas (i.e., for identifying "hot spots"). Identifying active areas and assigning actions is unique for each application and is labor intensive. Moreover, because there is no standard method for identifying and assigning active areas, the "hot spot" locations and their associated actions are lost when images with "hot spots" are cut and pasted or otherwise transferred between different multimedia applications.

It is one of the efforts of the present invention to move the assignment of active areas upstream into the capture process, that is, into the camera. In connection with specific camera-related action, such as exposure control, there are cameras that permit the photographer to select an area within the viewed image in order to initiate a camera action with respect to the selected area. For instance, in U.S. Pat. No. 5,280,359 the image picked up by an image sensor is divided into plural blocks and then displayed as a blocked image. The photographer specifies a particular block as a photometric area, and the subsequent exposure control is based on that area. The identification of the photometric area, however, is not retained and plays no role in any subsequent downstream processing outside of the camera.

SUMMARY OF THE INVENTION

The present invention is directed to overcoming one or more of the problems set forth above. Briefly summarized, according to one aspect of the present invention, a camera includes an image receiver for capturing an image of an object, an optical section for directing image light from the object to the image receiver, and a viewfinder for viewing the object prior to capture together with a pattern used for specifying active "hot spot" areas in the viewed image. The pattern in the viewfinder is composed of a plurality of individual areas that are visible through the viewfinder together with the image of the object. The camera further includes means for designating one or more individual areas as active areas of the image, and means for recording a location of the active areas in a memory location that is accessible to apparatus external to the camera.

In a further aspect of the invention, the memory location is in a removable memory, and the camera is part of a system in which the apparatus external to the camera is a computer that includes a program responsive to the recorded locations in the removable memory for enabling one or more specific actions to be assigned to the active areas of the recorded image.

The advantage of the invention lies in the provision for designating areas during the capture process. Compared to the prior art, labor is reduced by having the designation procedure virtually coincident with capture. The photographer can frame the image with the active areas immediately in mind, which reduces the time normally involved when it is done later in the process. By identifying and assigning active areas at the origin of the imaging process, the assignment process is effectively standardized. Furthermore, the active area locations are stored with, and travel with, the images. This helps to preserve active area locations when images are transferred, e.g., between different multimedia applications.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 shows a drawing of a digital camera including an active image area identifier according to the invention;

FIG. 2A is a diagram of the viewfinder used in the camera shown in FIG. 1;

FIG. 2B is a diagram of the image obtained through the viewfinder shown in FIG. 2A;

DETAILED DESCRIPTION OF THE INVENTION

Figure 3:
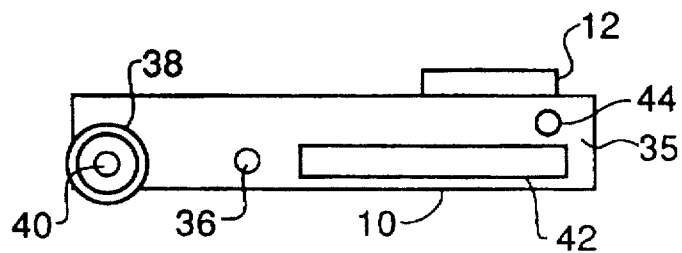
FIG. 3 is a view of the top control panel of the camera shown in FIG. 1.

FIG. 1 shows a frontal view of a camera 10 having an optical section 11, including a lens 12, and an image receiver 14. The lens 12 has an optical path for directing image light upon the image receiver 14 (which is shown in broken line to locate its placement behind the lens 12). While FIG. 1 shows a digital camera 10, and while the image receiver is accordingly an electronic sensor such as a charge coupled device (CCD) sensor, the camera could be a conventional photographic camera, and the image receiver 14 would then be a photographic film. As shown together in FIGS. 1 and 2, the camera includes a viewfinder 16 for viewing an object 28 prior to image capture. (The viewfinder 16 is shown oversized to illustrate aspects of the invention, as will be described.)

The viewfinder 16 includes two overlapping viewfinder optical paths for projecting two images to the eye of an observer. In one optical path devoted to active image area identification, an image is generated on an internal liquid crystal display (LCD) panel 18, imaged through a first objective lens 20, and reflected by a beamsplitter 22 upon a finder viewing plane 24. In the other optical path, an optical image of the object 28 is focused by a second objective lens 26 upon the finder viewing plane 24. The LCD panel 18 generates a grid-like pattern 30, hereinafter referred to as a tile pattern, which is superimposed as a mostly transparent template over the image of the object 28. The tile pattern 30 is composed of a number of intersecting lines which define individual tile areas 32, one or more of which may be designated as an active area. In the course of deciding which tile areas should become active areas, each tile area 32 is capable of being individually highlighted for consideration, such as the highlighted area 34. From the viewpoint of an observer positioned at the viewing plane 24, the viewfinder 16 generates a secondary image of the tile pattern 30 composed of a plurality of the individual tiles areas 32 that are visible through the viewfinder 16 together with the image of the object 28.

As shown together in FIGS. 1 and 3, a top control panel 35 of the camera 10 includes a multi-functional mode selector switch 36 for selecting among several camera operation modes, including an active image area designation mode. The mode switch 36 is also used to select the functionality of a thumbwheel switch 38. The thumbwheel switch 38 accordingly functions both as a tile pattern selection switch (38a) for selecting a particular tile pattern 30 and as a tile area designation switch (38b) for cycling through the tile areas 32 and highlighting one tile area after the other. A "hot spot" selector switch 40 is used to designate a particular highlighted tile area 34 as an active area ("hot spot").

The action of enabling the "hot spot" switch 40 causes some further change in the highlighted tile area 34, such as the overall graying of the area such that a darkened underlying image is seen through a grey tint. An external LCD panel 42 displays the mode selected by the mode selector switch 36. The camera 10 also includes a shutter release 44 for initiating image capture and an output memory 48 for storing the captured image. The memory 48 is shown in FIG. 1 as a removable memory and accordingly functions as a memory location that is accessible to apparatus, e.g., a computer, external to the camera 10. Subsequent to designation of one or more individual tile areas 32 as active areas of the image, the locations of these active areas are also stored in the memory 48. Such locations may be positional coordinates, X-Y addresses, or the like.

Figure 4:
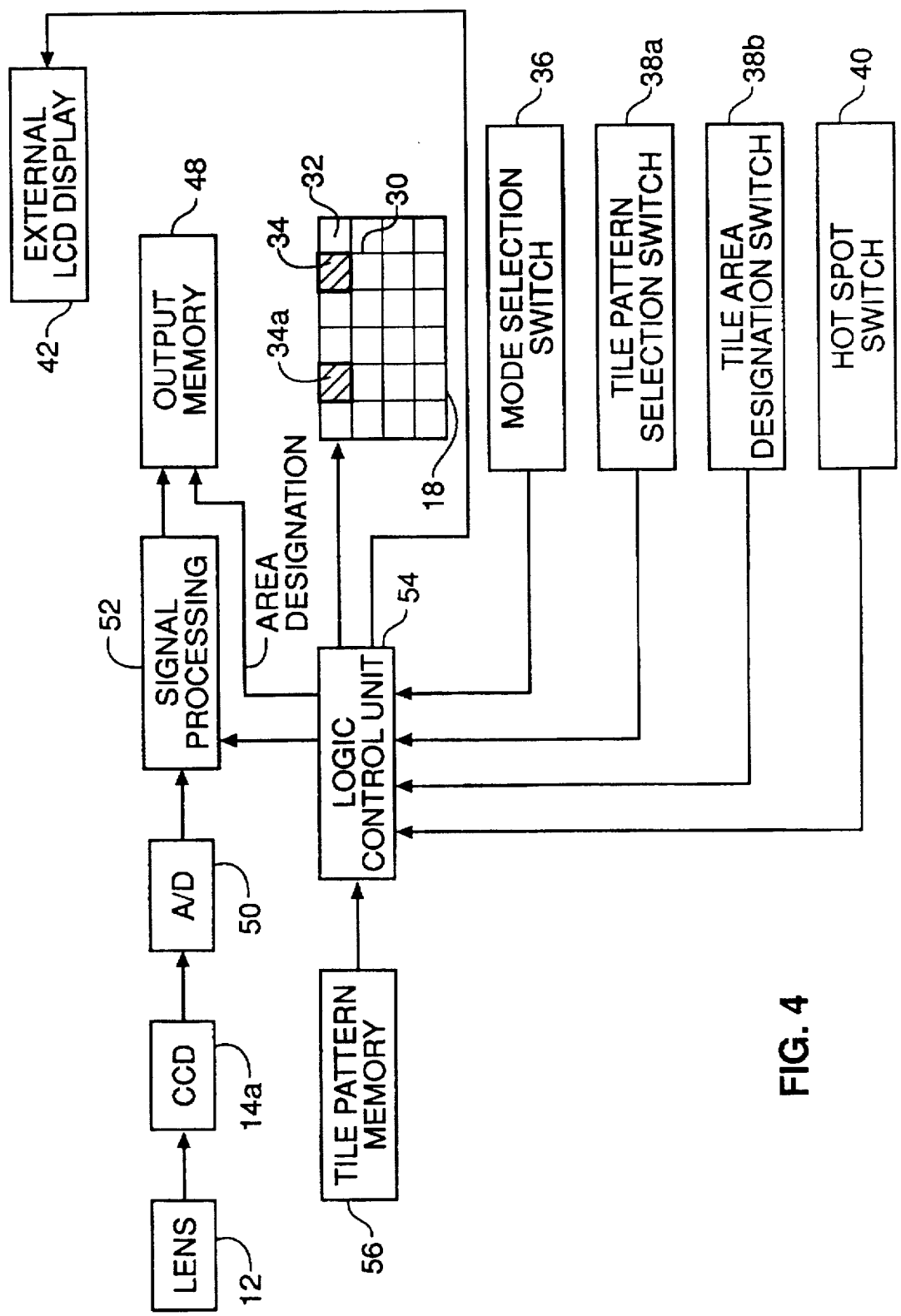
FIG. 4 is a block diagram of the camera shown in FIG. 1.

FIG. 4 is a block diagram of a digital camera, and repeats some of the elements described in the preceding figures. The image captured by the image receiver 14, here shown as a CCD 14a, is converted to digital data by an analog-to-digital (A/D) converter 50, processed in a signal processing section 52, and stored in the output memory 48. The camera also includes a logic control unit 54 for driving the LCD panel 18 in the viewfinder 16, and a pattern memory 56 for storing a plurality of tile patterns that may be generated on the LCD panel 18. As described before, the thumbwheel switch 38 performs, depending on the mode selected, either as a tile pattern selection switch 38a for selecting a particular pattern stored in the pattern memory 56, or as a tile area designation switch 38b for sequentially highlighting one area 32 after another (e.g. highlighted area 34) until the desired active area is highlighted. To designate a highlighted area as a "hot spot" active area, the "hot spot" switch 40 is engaged, and the location of the designated active area in the image area is noted by the logic control unit 54. To facilitate identification of these active areas in the viewfinder 16, the active areas are greyed (as shown by the greyed area 34a). One or more areas 34a may be designated as active areas; at an appropriate moment in the processing cycle, their location addresses are stored in the output memory 48.

Figure 8:
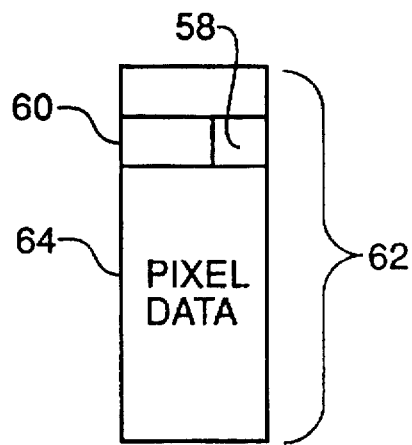
FIG. 8 is an illustration of the file format for data output by the digital camera shown in FIG. 4.

In the output data stream of the digital camera, the tile areas identified as active "hot spot" areas are noted in a tiling table contained as a separate tiling field 58 in a file header 60 of the image format 62, as shown in FIG. 8. Depending on the number of tile areas 32 in the tile pattern 30, a predetermined number of bits are designated in the tiling field 58. Presence or absence of an active area in a certain tile area in the overall tile grid is noted with a "1" or a "0". For example, with "1" indicating an active area, a 4×4 grid could be designated as follows,

1000000000000001 where the first and last tile areas (in this example) have been designated active areas. Where the active area bit is present, an application program in the external apparatus (computer) will identify image pixel data in a pixel data field 64 associated with the active area, and further associate the location of such image pixel data with special processing according to the application.

Figure 9:
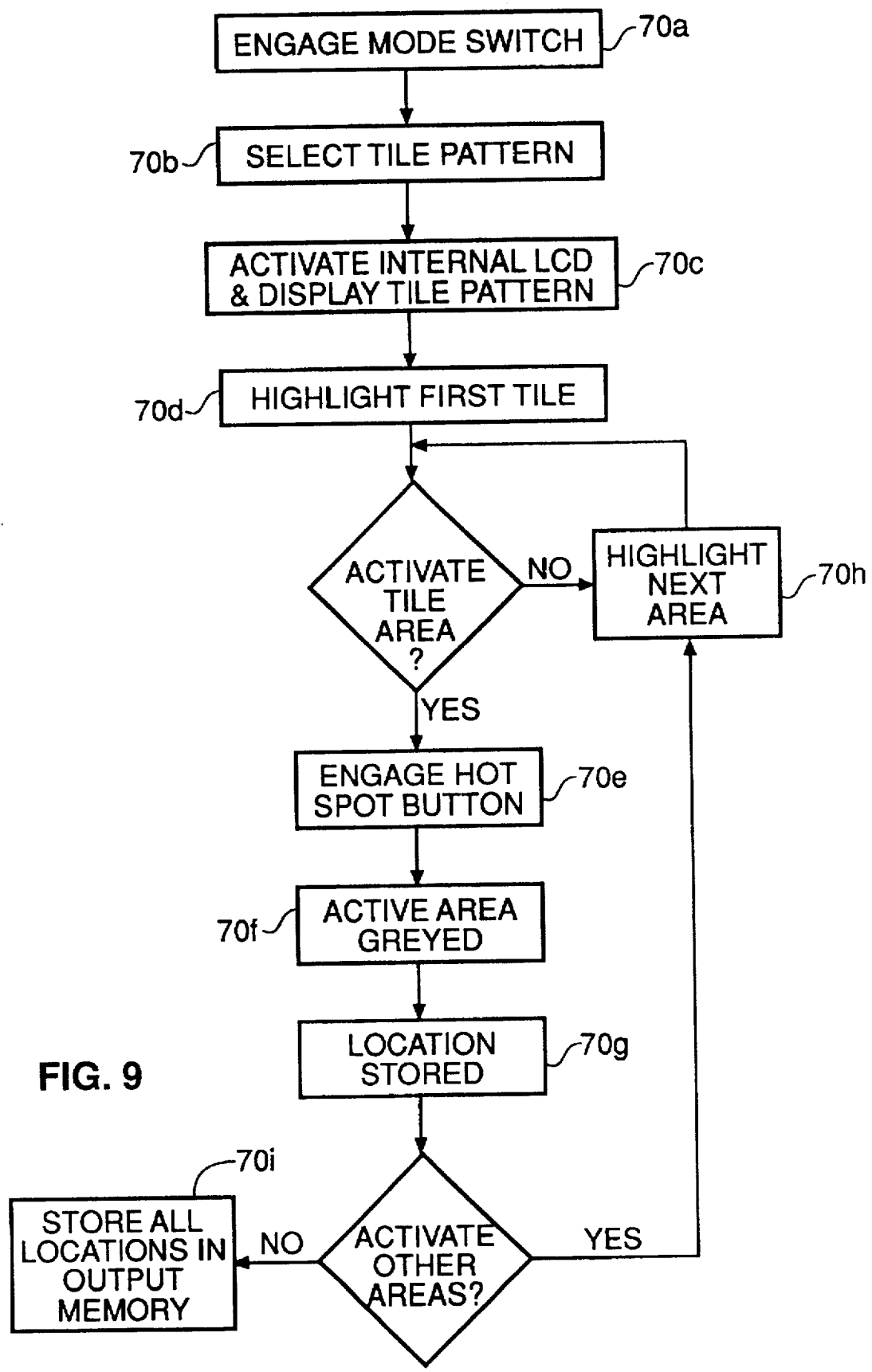
FIG. 9 is a flowchart of a procedure for identifying active image areas.

The operation of the digital camera of FIG. 4 is shown by the flowchart of FIG. 9. Once the mode switch 36 is engaged to select the "hot spot" feature on the camera (step 70a), the mode selected is shown on the external LCD panel 42. Several different tile patterns are stored in the pattern memory 56 and, in this connection, the mode switch 36 is enabled to condition the thumbwheel 38 to effectuate a choice among these tile patterns. The photographer pages through the stored tile patterns by using the thumbwheel 38 and selects the tile pattern (step 70b) to be applied to the image represented in the viewfinder 16 (step 70c). The mode switch 36 is then used to enable the tile area designation function, which begins by highlighting the first tile in the pattern (step 70d). The photographer then decides whether the highlighted tile area is of sufficient interest to be activated. If it is, the "hot spot" button is pressed (step 70e), the active area is further greyed (step 70f), and the tile area location is stored in a buffer (step 70g). If it is not to be activated, the thumbwheel 38 is rotated, the next area is highlighted (step 70h) and the process is repeated. (If the photographer has a change of mind, the "hot spot" button 40 would be programmed so that the photographer could return to a designated tile area, push the button and erase the tile area as an active area.) After all tile areas are processed, the locations of the areas selected to become active are stored in the output memory 48 (step 70i).

Figure 5:
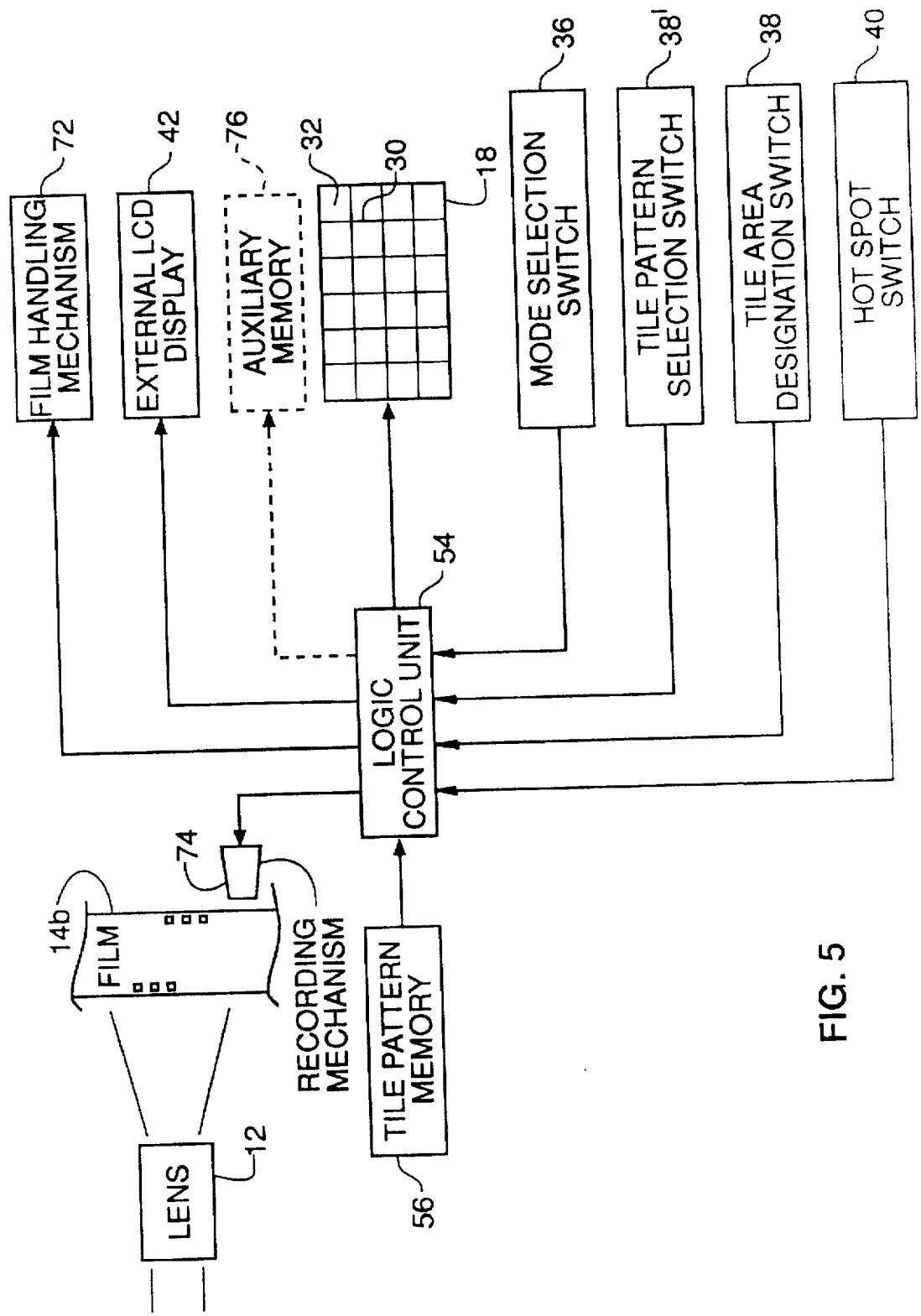
FIG. 5 is a block diagram of a film camera including an active image area identifier according to the invention.

FIG. 5 shows an embodiment of the invention used in connection with a film camera, where the main difference relates to where the active area location data is stored. The logic control unit 54 drives a film handling mechanism 72, which advances and positions the image receiver 14, in this case a photographic film 14b, in the imaging plane of the lens 12, and also operates a recording mechanism 74, which is located in proximity to the film 14b. In one version of this embodiment, the data identifying the location of the active areas is recorded on designated magnetic areas in the film 14b. In that case, the recording mechanism 74 is a magnetic head. In another version, the recording mechanism 74 is an optoelectronic device, such as a light-emitting diode, and the data is exposed onto a photosensitive area of the film 14b. In yet another version, the logic control unit 54 records the data on a separate auxiliary memory 76, such as a removable integrated circuit card or chip. In the latter case, the recording mechanism 74 may be redundant and therefore not needed.

Figure 6:
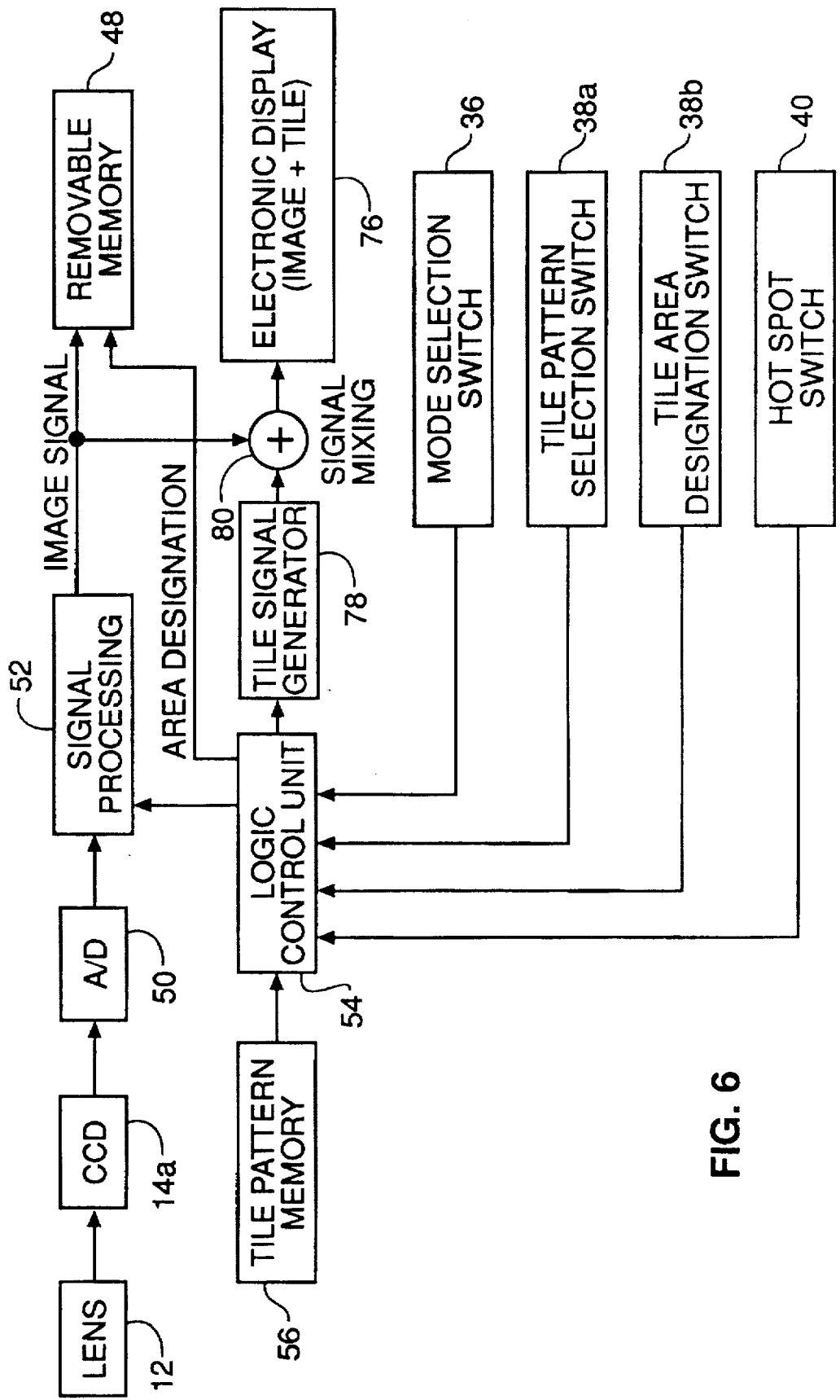
FIG. 6 is a block diagram of a further embodiment of a digital camera including an active image area identifier according to the invention.

FIG. 6 shows a third embodiment of the invention as used in a digital camera having an electronic viewfinder 76 (rather than the optical viewfinder 16 shown in FIG. 1). The selected tile pattern is converted into a video signal by a tile signal generator 78 and combined with the image signal in a signal mixing section 80. The combined video signal (image signal plus tile signal) is then displayed in the electronic viewfinder 76. As in the embodiment of FIG. 4, the data identifying the active area is recorded together with the image signal in the removable memory 48.

Figure 7B:
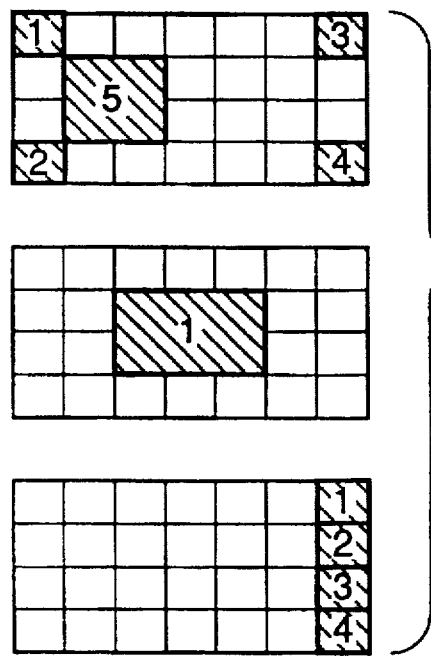
FIG. 7(B) shows a number of prerecorded tile patterns that are useful with any of the aforementioned embodiments.
Figure 7A:
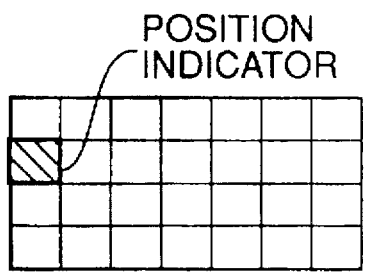
FIG. 7(A) shows an example of manual active area selection.

It could be envisioned that the camera could be provided in two models: one model which would provide only a manual active area selection (not requiring multiple tile patterns in the memory 56) and another providing a choice of tile patterns as stored in the memory 56. FIGS. 7(a) and 7(b) illustrate these options, where FIG. 7a shows that the active area in the manual camera would always be made by utilizing the aforementioned controls (mode selector 36 10 and thumbwheel 38) only as a position indicator, while FIG. 7b shows several customized grids that would appear, when selected, in the viewfinder with designated areas already highlighted and greyed as active areas. The data identifying these areas would then automatically be recorded in the output memory 48 without further action by the photographer.

Figure 10:
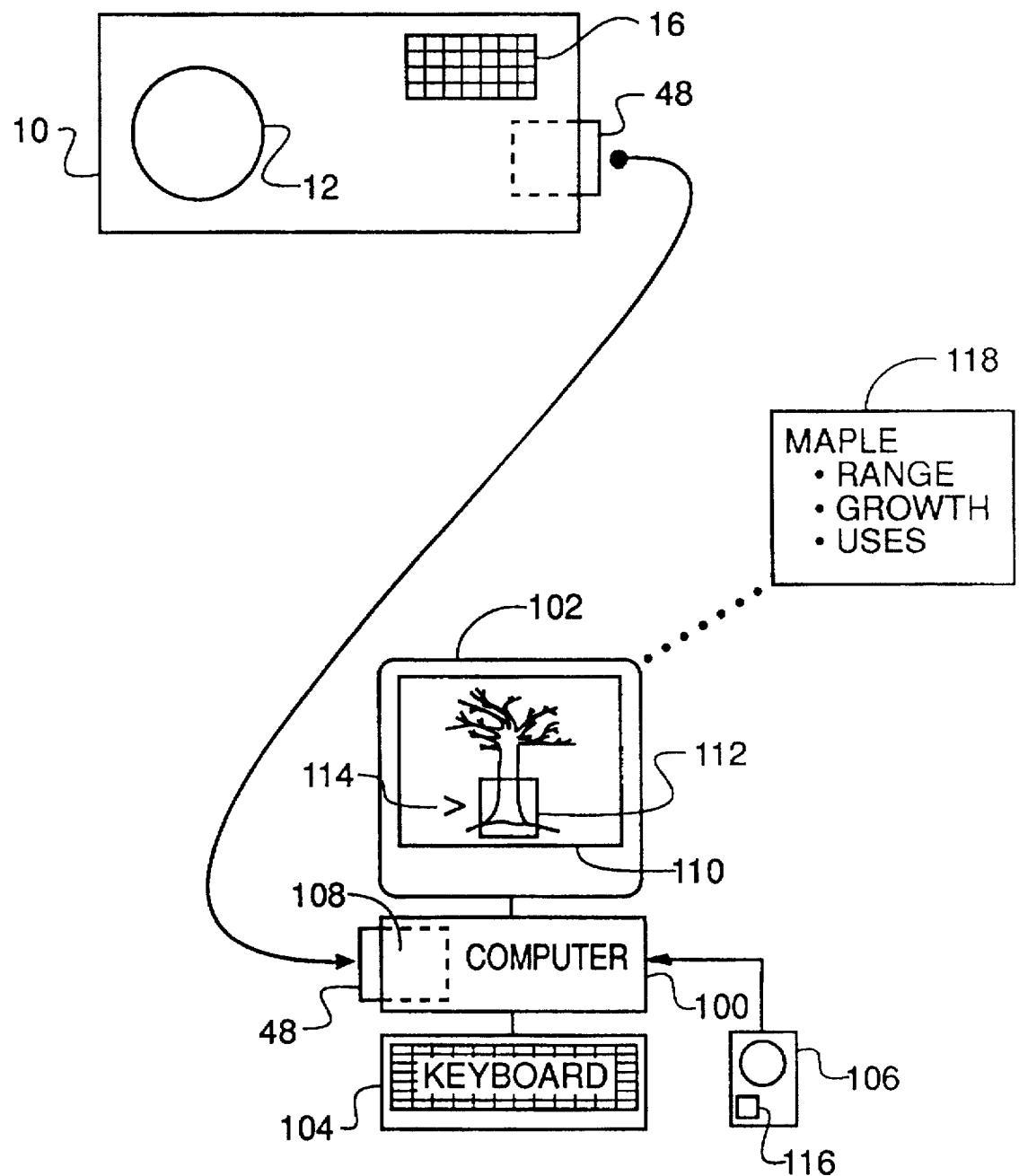
FIG. 10 shows an application of the invention with a desktop computer.

FIG. 10 shows a system application of the invention with apparatus external to the camera, wherein the external apparatus includes a computer 100, a monitor 102, a keyboard 104, and a trackball or like cursor pointing device 106. The computer 100 includes a card slot 108 for receiving the removable memory 48 from the camera 10. Stored in the removable memory 48 are images together with the locations of their "hot spot" active areas, if any were designated. In the example of FIG. 10, a primary image 110 of a tree, recorded by the camera 10, is displayed on the monitor 102 together with an application "hot spot" active area 112. The coordinates for the location of the active area 112 is predetermined from location data in the removable memory 48, which was also recorded by the camera 10. As is customary with such application programs, when a cursor 114 is placed over the active area 112 by use of the trackball 106, a trackball switch 116 is clicked and the program branches to a branching screen 118 which is related to information on the primary image 110. Following along the lines of the example in FIG. 10, clicking on the active area 12 leads to the branching screen 118 showing the identity of the tree ("maple") and further key words ("range", "growth", "uses") that can be used as further active areas for additional branching. The application programming for such programs is with the conventional skill in the art and, moreover, is simplified since it is unnecessary for the computer user to designate the "hot spot" active areas (as in the prior art) on the primary image 110.

The invention has been described with reference to a preferred embodiment. However, it will be appreciated that variations and modifications can be effected by a person of ordinary skill in the art without departing from the scope of the invention. For example, while the tile pattern 30 is shown as a checkerboard composed of intersecting lines and equal-sized tile areas 32, other patterns are possible. The pattern 30 could be a pie-shaped segmentation radiating from a central point, or a group of disconnected boxes (or circles, etc.) that would appear in the viewfinder image. The tile areas could be differently sized, as well, with (e.g.) smaller areas over likely areas of subject interest and larger areas around the periphery of the image. Moreover, while the output memory 48 has been described as removable memory which is thereby made accessible to an external computer by physically removing and relocating the memory, the output memory 48 could instead remain resident in the camera, and the image data and associated active area locations could be downloaded to the external apparatus through a cable linkage, a radio-frequency linkage, or the like.

PARTS LIST 10 camera
11 optical section
12 lens
14 image receiver
14a CCD
14b film
16 viewfinder
18 internal LCD panel
20 first objective lens
22 beamsplitter
24 viewing plane
26 second objective lens
28 object
30 tile pattern
32 tile areas
34 active tile area
35 top control panel
36 mode selector
38 thumbwheel
38a tile pattern selection switch
38b tile area designation switch
40 "hot spot" selector
42 external LCD panel
44 shutter release
48 removable memory
50 A/D converter
52 signal processing section
54 logic control unit
56 pattern memory
58 tiling field
60 file header
62 image format
64 pixel data field
70a–i functional blocks
72 film handling mechanism
74 recording mechanism
76 electronic viewfinder 78 tile signal generator
80 signal mixing section
100 computer
102 monitor
104 keyboard
106 trackball
108 card slot
110 primary image
112 application active area
114 cursor
116 trackball switch
118 branching screen

What is claimed is:

1. A camera including an image receiver for capturing an image of an object, an optical section for directing image light from the object to the image receiver, a viewfinder for viewing the object prior to capture, and a memory location that is accessible to an apparatus external to the camera, said camera comprising:

means for generating a pattern in the viewfinder composed of a plurality of individual areas that are visible through the viewfinder together with the image of the object;

means for designating one or more individual areas as one or more active areas of the image, said one or more individual areas comprising a subset of the individual areas visible together with the image and which are used in the apparatus external to the camera for special processing distinct from processing applied to areas not designated by said designating means;

means for associating the captured image with the memory location; and means for recording a location of said one or more active areas in the memory location that is accessible to the apparatus external to the camera.

2. A camera as claimed in claim 1 further including an internal memory for storing a plurality of different patterns, and wherein the generating means includes a selector for selecting one of the patterns.

3. A camera as claimed in claim 1 wherein the memory location is in a removable memory, and wherein the recording means records the location of the active areas in the removable memory.

4. A camera as claimed in claim 3 wherein the image receiver is an electronic image sensor that produces an image signal representative of the image, and the image signal is stored together with the location of the active areas on the removable memory.

5. A camera as claimed in claim 1 wherein the image receiver is photographic film, the memory location is on the film, and the recording means records the location of the active areas on the film.

6. A camera as claimed in claim 5 wherein the film includes a magnetic area and the recording means is a magnetic recording means that records the location of the active areas on the magnetic area.

7. A camera as claimed in claim 5 wherein the recording means is a light emitting means that records a data signal on the film indicative of the location of the active areas.

8. A camera as claimed in claim 1 for use in a system in which the apparatus external to the camera is a computer that includes a program responsive to the recorded locations for enabling one or more specific actions to be assigned to the active areas of the recorded image.

9. A camera as claimed in claim 1 wherein the viewfinder is an optical viewfinder having an auxiliary optical path for viewing the object prior to capture and an electro-optical display panel positioned relative to the auxiliary optical path to be visible through the viewfinder, and wherein the generating means activates the display panel to generate a secondary image of the pattern composed of the plurality of individual areas that are visible through the viewfinder together with the image of the object.

10. A camera as claimed in claim 9 wherein the electro-optical display is a liquid crystal display.

11. A camera as claimed in claim 10 wherein a beamsplitter is included in the auxiliary optical path to direct the secondary image from the liquid crystal display through the viewfinder.

12. A camera as claimed in claim 1 wherein the image receiver is an electronic image sensor that produces an image signal representative of the image, the viewfinder is an electronic viewfinder having an electronic display for viewing the object prior to capture, and wherein the generating means generates an electronic image signal of the pattern that is electronically combined with the image signal, said electronic image signal composed of the plurality of individual areas that are visible on the electronic display together with the image of the object.

13. A camera including an image receiver for capturing an image of an object, an optical section having an optical path for directing image light from the object to the image receiver, and a viewfinder having an auxiliary optical path for viewing the object prior to capture, said camera comprising:

an electro-optical display panel positioned relative to the auxiliary optical path to be visible through the viewfinder;

a memory for storing a plurality of different tile patterns each composed of a plurality of individual tile areas;

a selector for selecting a particular tile pattern stored in the memory;

means responsive to the memory for activating the display panel to generate a tiled image of the particular tile pattern, said tiled image composed of a plurality of individual tile areas that are visible through the viewfinder together with the image of the object;

means for designating one or more individual tile areas as one or more active areas of the image, said one or more individual areas comprising a subset of the individual areas visible together with the image and which are used in an apparatus external to the camera for special processing distinct from processing applied to areas not designated by said designating means; and means for storing a location of said one or more active areas in association with the captured image.

14. A camera as claimed in claim 13 further including a removable output memory, and wherein the storing means stores the location of the active areas on the removable output memory.

15. A camera as claimed in claim 14 wherein the image receiver is an electronic image sensor that generates an image signal representative of the image, and the image signal is stored together with the location of the active areas on the removable output memory.

16. A camera as claimed in claim 13 wherein the image receiver is photographic film, and the storing means stores the location of the active areas on the film.

17. A camera as claimed in claim 16 wherein the film includes a magnetic area and the storing means is a magnetic recording means that records the location of the active areas on the magnetic area.

18. A camera as claimed in claim 13 wherein the electro-optical display is a liquid crystal display.

19. A camera as claimed in claim 18 wherein a beam-splitter is included in the auxiliary optical path to direct the tiled image from the liquid crystal display through the viewfinder.

20. A method for identifying and designating active areas in an image, said image captured by a camera including an image receiver, an optical section for directing image light from an object to the image receiver, a viewfinder for viewing the object prior to capture, and a memory location that is accessible to an apparatus external to the camera, said method comprising the steps of:

generating a pattern in the viewfinder composed of a plurality of individual areas that are visible through the viewfinder together with the image of the object;

designating one or more individual areas as one or more active areas of the image, said one or more individual areas comprising a subset of the individual areas visible together with the image and which are used in the apparatus external to the camera for special processing distinct from processing applied to areas not designated by said designating means;

means for associating the captured image with the memory location; and recording a location of said one or more active areas in the memory location that is accessible to the apparatus external to the camera.

21. A method as claimed in claim 20 further including the steps of storing a plurality of different patterns, and selecting one of the patterns.

22. A method as claimed in claim 20 wherein the memory location is in a removable memory, and the method further includes the step of recording the location of the active areas in the removable memory.

23. A method as claimed in claim 21 wherein the image receiver is an electronic image sensor that produces an image signal representative of the image, and the method further includes the step of storing the image signal together with the location of the active areas on the removable memory.

24. A method as claimed in claim 20 wherein the image receiver is photographic film, the memory location is on the film, and the method further includes the step of recording the location of the active areas on the film.

25. A system for identifying and designating active areas in an image, said system including a digital camera and a peripheral processor, said system comprising:

(A) the digital camera including an electronic image sensor for capturing an image of an object and generating an image signal representative of the object;

an optical section for directing image light from the object to the image sensor;

a viewfinder for viewing the object prior to capture;

a memory;

means for generating a pattern in the viewfinder composed of a plurality of individual areas that are visible through the viewfinder together with the image of the object;

means for designating one or more individual areas as one or more active areas of the image, said one or more individual areas comprising a subset of the individual areas visible together with the image and which are used in the peripheral processor for special processing distinct from processing applied to areas not designated by said designating means; and means for recording the image signal in the memory together with location data identifying the location of said one or more active areas; and (B) the peripheral processor including:

a computer for accessing the memory and generating a display signal from the image signal and the location data;

a monitor responsive to the display signal for displaying a screen image of the object together with the active areas; and a program running on the computer and responsive to the recorded locations for enabling one or more specific actions to be assigned to the active areas of the recorded image.

* * * * *